United States Patent
Murray

(10) Patent No.: US 7,773,775 B2
(45) Date of Patent: Aug. 10, 2010

(54) SURROGATE DOCUMENT INDICATOR AND METHODS OF USING SAME

(75) Inventor: Scott S. Murray, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 741 days.

(21) Appl. No.: 11/160,110

(22) Filed: Jun. 9, 2005

(65) Prior Publication Data

US 2006/0280354 A1 Dec. 14, 2006

(51) Int. Cl.
G06K 9/00 (2006.01)
(52) U.S. Cl. .................................. 382/112
(58) Field of Classification Search ............ 382/112, 382/137, 305, 306; 705/35, 45; 707/104.1
See application file for complete search history.

(56) References Cited

U.S. PATENT DOCUMENTS

| | | | | |
|---|---|---|---|---|
| 6,243,502 | B1* | 6/2001 | Christensen et al. | 382/305 |
| 6,351,553 | B1* | 2/2002 | Hayosh | 382/139 |
| 6,912,297 | B2* | 6/2005 | Scott et al. | 382/112 |
| 7,167,580 | B2* | 1/2007 | Klein et al. | 382/112 |

| | | | | |
|---|---|---|---|---|
| 2004/0109596 | A1* | 6/2004 | Doran | 382/137 |
| 2004/0213434 | A1* | 10/2004 | Emerson et al. | 382/112 |

FOREIGN PATENT DOCUMENTS

| | | |
|---|---|---|
| EP | 0115189 | 8/1984 |
| EP | 0671696 | 9/1995 |

OTHER PUBLICATIONS

Bank of America Corporation, International Application Ser. No. PCT/US2006/022346, International Search Report, Nov. 3, 2006.
Bank of America Corporation, International Application Ser. No. PCT/US2006/022346, Written Opinion, Nov. 3, 2006.

* cited by examiner

*Primary Examiner*—Brian Q Le
(74) *Attorney, Agent, or Firm*—Michael A. Springs; Moore & Van Allen PLLC

(57) ABSTRACT

Surrogate document indicator and methods of using same. A surrogate document image encoded on a storage medium as part of a database or repository of images includes a surrogate document image indicator. In example embodiments, images within the system, including surrogate document images are stored in tagged image file format (TIFF) and the TIFF header includes the surrogate document image indicator. When images are retrieved by an application from an archive or a check image management system, each one is programmatically examined to detect the presence of the surrogate document image indicator. If necessary, the image with the indicator is treated as an exception.

18 Claims, 3 Drawing Sheets

SURROGATE DOCUMENT INDICATOR AND METHODS OF USING SAME

BACKGROUND

Financial institutions have established various processes and associations related to the exchange of documents evidencing monetary transactions. Such documents have historically been encoded with magnetic ink so that information from the documents can be read by machine. Such documents have thus become known as magnetic ink character recognition (MICR) documents. Check processing and sorting systems have also been developed in which a check or similar MICR document has its image captured and stored electronically. Such an image can be archived so that it is indexed with its accompanying data from a MICR read. During this image capturing process it may be realized that the image captured is unusable for reasons such as poor quality of the paper document or operational oversight. In such a case, a stored image of a "surrogate" document is inserted in place of the scanned image. This surrogate image acts as a placeholder and if viewed or printed would contain a readable explanation as to why the image of the check is not available.

As long as images of checks or similar documents were used by financial institutions primarily to supply records to customers, or for archival purposes, the presence of surrogate images had no serious ramifications for the check clearing process. However, legislation has authorized banks to do away with the use of paper for settlement and reconciliation of accounts between banks. In the United States for example, this legislation is referred to as "The Check Clearing for the $21^{st}$ Century Act" or simply "Check 21" and authorizes the use of electronic records for presentment from one bank to another as long as the images in the electronic records actually represent any original paper documents. In cases where a paper document is needed, the legislation authorizes a bank to create one in the form of a "substitute check." A substitute check contains an image of the front and back of the original check, as well as a MICR line that can be read by standard MICR equipment. The substitute check carries with it the full faith and credit formerly attributed to paper checks, as long as it meets the standards specified in the legislation.

Because a surrogate document image contained in a bank's check imaging system cannot be used to satisfy the requirements of legislation such as Check 21, its presence in the system must be documented and monitored. In at least some installations, this tracking is accomplished by maintaining audit listings, which are then in turn passed to applications that need to differentiate between surrogate image documents and actual check images.

SUMMARY

Example embodiments of the present invention provide a way to readily and programmatically identify surrogate document images stored in an archive or a check image management system of a financial institution. The processes and data structures of the invention can be implemented within current standards, and can reduce or eliminate the need to maintain exception and/or audit lists to identify surrogate document images to all the various software applications which make use of check images within an institution.

In at least some embodiments, a surrogate document image is encoded on a storage medium as part of a data base or image repository when a scanned image does not possess acceptable image quality includes placeholder image information, and a surrogate document image indicator. The placeholder image information may be a graphical logo, text, or some combination of the two, for example, a human readable sentence that says "Image not available." In example embodiments, images within the system, including surrogate document images are stored in tagged image file format (TIFF) and the TIFF header can include the surrogate document image indicator, for example, at or near the end of the header information.

The surrogate document image indicator can be used as part of the process for scanning of documents to store images. A quality inspection can be performed on an image to determine if the scanned image possesses an acceptable image quality. The quality inspection can be performed by standard image quality software that detects for skewed images, folded documents, misfeeds, poor contrast, and the like. If it is determined that the image quality is not acceptable, the scanned image of the document in question can be replaced with a surrogate document image. The surrogate document image includes a surrogate document image indicator, and can then be stored among the plurality of images of documents maintained in the system.

When images are retrieved by an application from an archive or a check image management system, each one is programmatically examined to detect the presence of the surrogate document image indicator. If necessary, the image with the indicator is treated as an exception. For example, if an application is creating substitute checks, the indicator tells the application that the image cannot be used for this purpose and an exception process is triggered for the item.

In some embodiments, a system including the various means to implement processes according to the invention can include connectivity to receive the scanned images from a sorter. A computing system with computer program code instructions is in turn interfaced to this connectivity. Connected or included storage media can be used to store images and to house one or more surrogate images to be copied as needed. The surrogate images each include the surrogate document image indicator.

DETAILED DESCRIPTION

Figure 1:
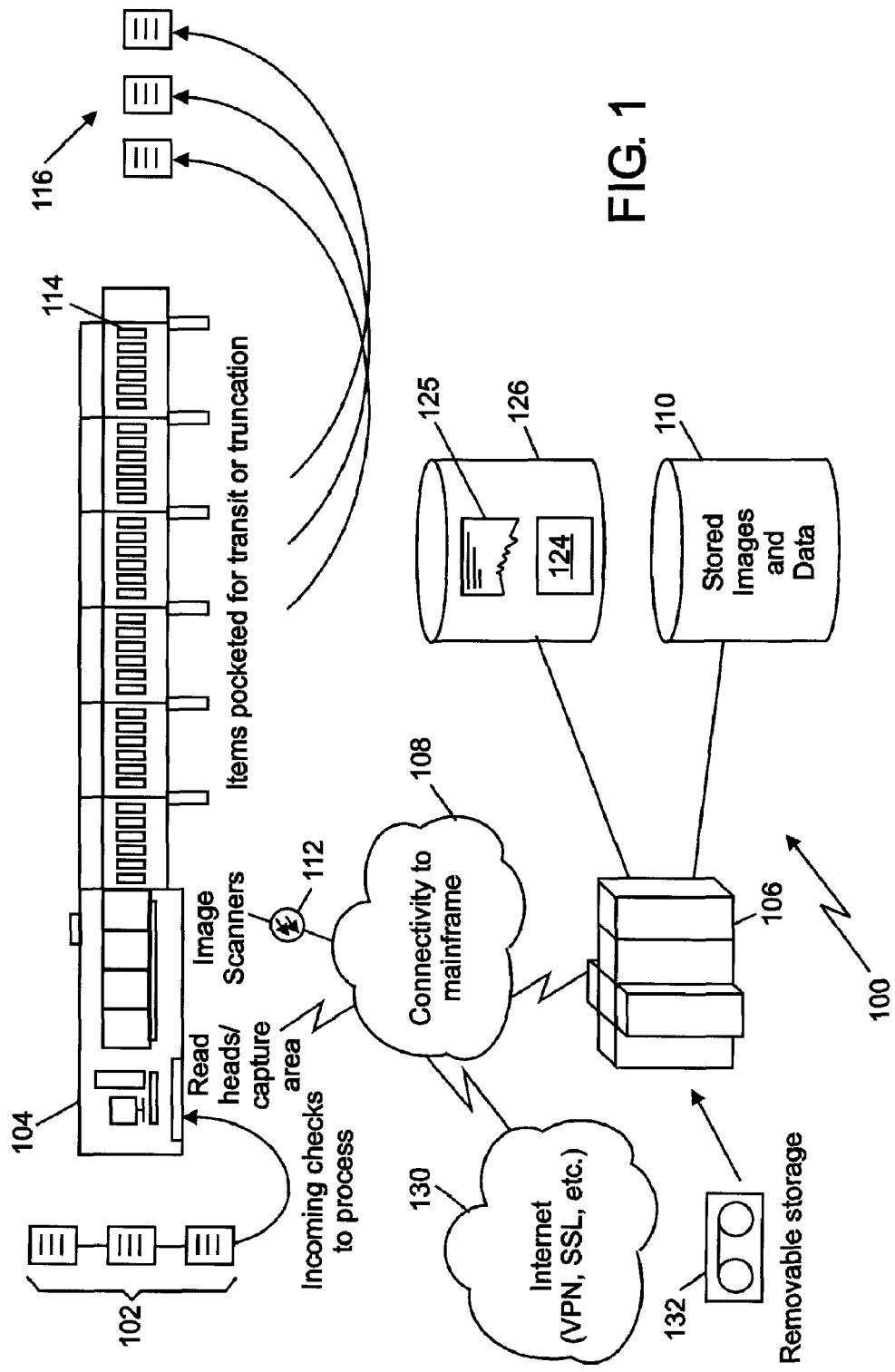
FIG. 1 is a block diagram of a system which handles scanned and surrogate images according to some embodiments of the invention.

The present invention will now be described in terms of specific, example embodiments. It is to be understood that the invention is not limited to the example embodiments described. It should also be understood that not every feature of the methods and apparatus described is necessary to implement the invention as claimed in any particular one of the appended claims. Various elements and features of various embodiments are described in order to fully enable the invention.

Throughout this disclosure, where a process or method shown or described, the steps of the method may be performed in any order or simultaneously, unless it is clear from the context that one step depends on another being performed first. With respect to flowcharts, block diagrams, flow diagrams, and the like, not every possible flow, path, or process block is shown. Rather, for clarity, only those processes and paths important to the inventive concepts being discussed relative to the drawing may be illustrated, although others maybe discussed in this description.

The meaning of certain terms as used generally in the context of this disclosure should be understood as follows. Terms such as "document" or "MICR encoded document" and the like are meant to refer to any document which tends to be handled and sorted in large volumes based on MICR information printed thereon. In the typical context, such documents are checks which order a bank to pay a certain sum to the order of another individual or entity. However, other documents evidencing financial transactions, and for that matter, other kinds of documents, can be "documents" for purposes of this disclosure. Terms like "bank" and "institution" are used herein in their broadest sense. Financial institutions that process transactions and documents of the types discussed herein can include stock brokerages, credit unions, and other types of institutions which are not strictly "banks" in the historical sense. Such terms can even encompass other types of businesses, such as retail establishments. Thus, the use of such terms herein is intended to encompass all such possibilities.

Terms such as "image" as well as "image document" and "document image" are intended to refer to electronic representations of documents which either have been, or could be printed on paper, irrespective of whether they would typically be represented in paper form or not. A "captured image" or "scanned image" is generally intended to mean an image that actually represents a financially meaningful paper document, irrespective of how that image was acquired. Terminology such as "surrogate" image, "surrogate image document" or "surrogate document image" is intended to refer to a place holder image file, which is intended to replace a scanned or captured image when the scanned or captured image is not available or not usable. Such terminology is intended to recognize the fact that, a surrogate image document could be created in the generic sense by scanning or otherwise capturing a piece of paper with a logo or sentence written thereon.

References will be made at various places within this disclosure to images stored in what is commonly known as a "check image management system" (CIMS). Such a system is well known within the banking industry by those who work in the financial data processing arts. Such data processing systems have historically been produced by the International Business Machines Corporation and marketed to banking and financial companies. Today, CIMS is produced and marketed by Carecker Corporation of Dallas, Tex., USA.

Images within CIMS are stored within the well known, tagged image file format (TIFF). TIFF is treated as a standard within the computing industry. The TIFF specification is promulgated by Adobe Systems Incorporated of Mountain View, Calif., USA. TIFF is a tag based file format for storing and exchanging images, where the images can also include descriptive data in the form of tags. Each tag field contained in a TIFF header describes a different attribute of the image data to follow. In at least some embodiments of the invention, the TIFF header is used to house the surrogate document image indicator. The specifics of using the TIFF header in this fashion will be discussed in further detail below with respect to FIG. 4.

For purposes of the remainder of this discussion, it can be assumed that any terms or standards not expressly defined have standard meanings, or meanings as would be understood by those of ordinary skill in the art. For purposes of illustration, it can also be assumed that the example embodiments described are implemented in the context of a check imaging and sorting operation at a bank or similar financial institution. As previously described, situations can occur in such an operation where a quality image representation of an original paper item can not be produced. In such a situation, surrogate image documents, which are typically stored, static entities, can be used when needed. Although the surrogate image is in no way a representation of the original paper item, for all intents and purposes, the image file structure of an image that truly represents a paper document and a surrogate image would be virtually indistinguishable but for the use of the surrogate document image indicator of the present invention. Surrogate image documents can be used in applications such as online banking, and the printing of check image statements. In these instances, where there is no image available, the surrogate image document can be included to highlight this fact. However, when the surrogate image may create problems, the surrogate document image indicator provides a means to programmatically determine when a surrogate image has been used, and thus also provides a way to flag surrogate images to that any problems that may arise can be dealt with in advance.

FIG. 1 presents a system, 100, which illustrates the operating environment for, and includes, an embodiment of the present invention. Incoming paper items, in this case checks, are shown at 102. The documents are sorted and read at a high-speed sorter, 104, for example, an IBM 3890 high-speed sorter. The checks pass through a capture area where read heads capture the MICR data and organize it into stored fields. This data is transmitted to computer system 106 via connectivity 108. This connectivity can be provided by any of various types of networks, for example, an internet protocol (IP) network, or a local area network (LAN). In this example, computing system 106 stores the data on fixed storage medium 110. The paper items, after they have been imaged, are sorted into pockets 114. Sorted, boxed items 116 are then stored, forwarded onto other banks, or otherwise properly routed within the financial institution.

System 100 of FIG. 1 also includes a second storage medium, 126, which further includes computer program code instructions, 124, for inserting and detecting the surrogate document image indicator within image files according to example embodiments of the present invention. Medium 126 also includes stored surrogate image document 125. Surrogate image document 125 is copied into the check image management system, which includes the stored images residing on medium 110. Electronic reconciliation and presentment can be accomplished using the Internet, 130, and usually takes place via a secure connection such as a virtual private network (VPN) connection or a secure sockets layer (SSL) connection.

It cannot be over emphasized that the system at FIG. 1 is provided as an illustrative example only. There are numerous types of document sorting systems that can be used to provide the appropriate functions. Most sorters typically have conventional document diverting mechanisms which rout the documents to various pockets. The sorter also captures MICR data, and scans the front and back of documents to capture the appropriate images. Although computing platform 106 in FIG. 1 is schematically illustrated as a "mainframe" computer, the computing platform could also be a server, workstation, or even a desktop or personal computer given the processing power that has been achieved in such devices in recent years.

It will be readily appreciated from studying FIG. 1 that at least some portions of some embodiments of the invention can be implemented through extensive use of computer program products, or computer program instructions to carry out processes of the invention. These instructions in combination with the computing platform processor and other devices form the means to carry out such embodiments of the invention. These computer program instructions may be part of a computer program or multiple programs that are supplied on a medium. Such a computer program product, taking the form of computer readable media that allows computer program instructions to be loaded into a computing platform, is illustrated as removable storage medium 132 of FIG. 1.

In addition to being supplied in the form of a machine readable medium or media, computer program instructions which implement the invention can also be supplied over a network. In such a case the medium is a stream of information being retrieved when the computer program product is downloaded. Computer programs which implement embodiments of the invention can reside on any medium that can contain, store, communicate, or transport the program for use by or in connection with any computing platform or instruction execution system, apparatus, or device. The medium may be, for example but not limited to, an electronic, magnetic, optical, electromagnetic, or semiconductor system or device. It should also be understood that the computing platform, storage media, connectivity, and sorting apparatus could all be combined into one large device with the computer program instructions stored internally.

Figure 2:
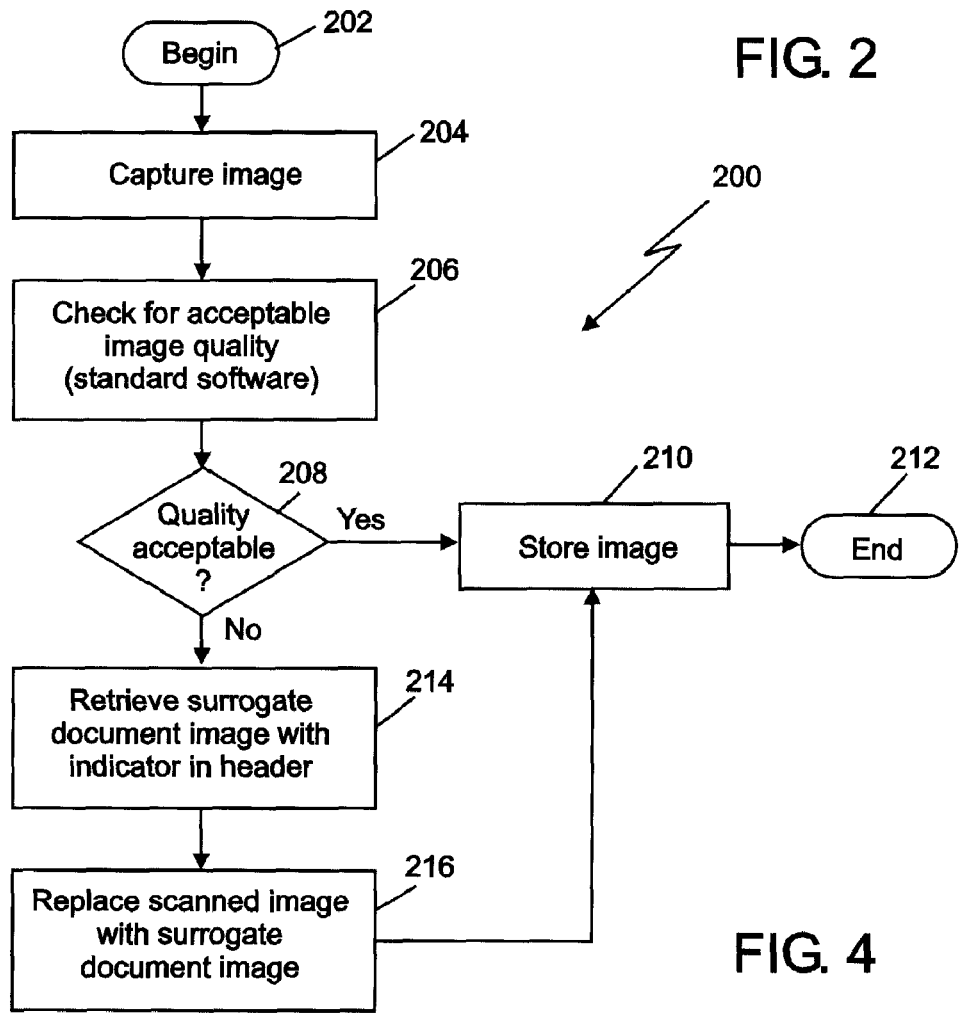
FIG. 2 is a flowchart illustrating the process of storing surrogate document images in place of scanned images according to at least some example embodiments of the invention.

FIG. 2 is a flowchart style illustration showing the process for using a surrogate document image having a surrogate document image indicator in its header according to at least one embodiment of the invention. As is typical with flowchart illustrations, the process is illustrated as a series of process blocks. Process 200 of FIG. 2 begins with block 202. At block 204, an image of a document is captured or scanned, for example, by a sorter. At block 206, a determination is made as to whether the captured image possesses acceptable image quality. This determination can be made with any various, off-the-shelf, image quality verification software packages. Such software packages check for skewed images, folded and bent documents, as well as poor contrast and similar problems that adversely affect the readability of the captured image. The process then branches at block 208 depending on whether image quality is acceptable.

Still referring to FIG. 2, if the image quality is acceptable at block 208, the captured image is stored at block 210. The process then ends at block 212. If the image quality is not acceptable at block 208, a surrogate image document is retrieved at block 214. This image file has been previously stored and includes the surrogate document image indicator in the header. At block 216, the scanned image is replaced with the surrogate document image. An image is again stored at clock 210, only in this case, the stored image is actually of a surrogate document and not of the corresponding actual paper document. The process again ends at bock 212.

Figure 3:
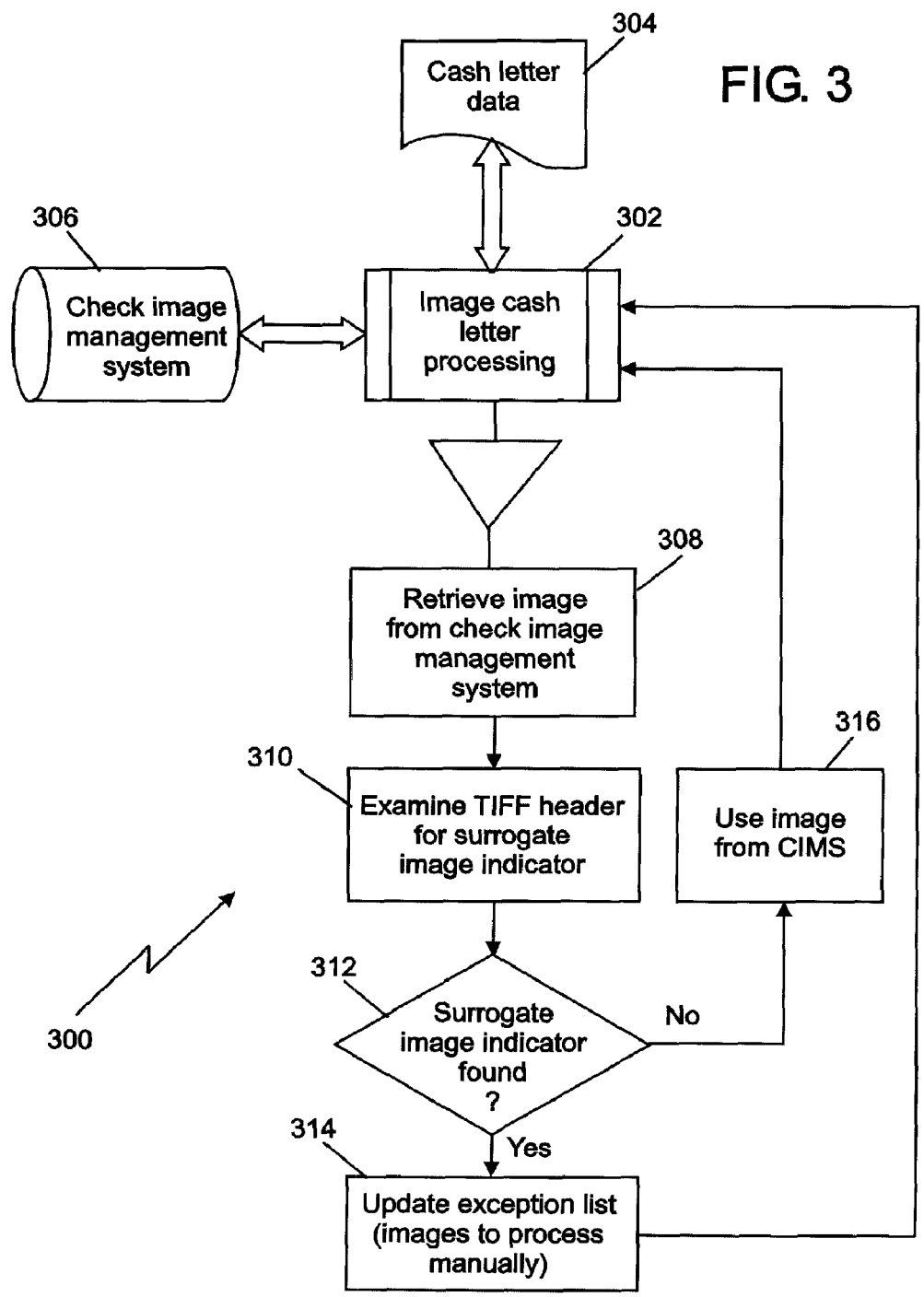
FIG. 3 is a combination flowchart and block diagram illustrating a use of a surrogate document image indicator according to some embodiments of the invention.

FIG. 3 is a combination flowchart and block diagram, which illustrates how the surrogate document image indicator of the present invention might be used by an application which accesses a check image management system. Process 300 includes image cash letter processing 302, and illustrates a portion of that processing which occurs where the surrogate document image indicator is in use. Image cash letter (ICL) processing represents a way to supply checks and similar items from a depositary or capture bank to a paying bank. For some time, posting a financial transaction to accounts at a clearing institution was accomplished through the use of a "cash letter" which contains detailed data on all the transactions to be cleared. At one time, cash letters were paper documents, but in the modern banking system, an "electronic cash letter" (ECL) file is typically used. An ECL file can also be referred to as an "electronic cash presentment" (ECP) file. ECP files are formatted according to accepted industry standards. With the advent of Check 21 in the United States and similar legislation in other countries, there is or will be a desire and need to include images of paper documents with this data to eliminate any need to transfer paper documents between banks. A file which includes both the data and the images is sometimes called an "image cash letter" (ICL) file. To meet banking standards, ICL files, as well as any substitute checks (also called image replacement documents) generated from an image cash letter file must use actual images of any paper documents and not surrogate image files.

Returning to FIG. 3, image cash letter processing 302 receives as input, cash letter data 304 as well as images from CIMS 306. During ICL processing, control transfers to processing block 308 where an image is retrieved. At block 310, the TIFF header of the image file is examined for the surrogate image indicator. At block 312, if the surrogate image indicator is found, processing branches to where an exception list is updated or some other exception process takes place at block 314. In at least some embodiments, this eventually causes the item to be processed manually, but automated processes could also be used to handle the exception. Returning to block 312, if the surrogate image indicator is not found, the image from the check image management system (CIMS) can then be used at block 316.

Figure 4:
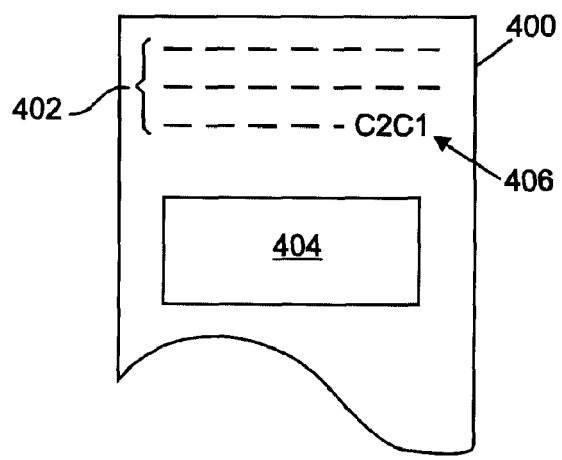
FIG. 4 is a schematic representation of an example surrogate document image.

FIG. 4 is a schematic illustration of an embodiment of a surrogate document image, 400, which can be stored on a computer readable storage medium. Surrogate document image 400 includes header 402 and image information 404. In example embodiments, the image information is essentially place holder information which may be acquired by scanning or created with graphics software. For example, the place holder image information may include a logo, a statement regarding the fact that this is a surrogate image, or some combination of the foregoing. Header 402, in example embodiments of the invention includes the surrogate document image indicator, 406. This indicator can be disposed within the header in various places and manners. In the example embodiment described here, surrogate document image 400 is a TIFF file and header 402 is a TIFF header.

In this example, the hexadecimal value C2C1 is used as the indicator and it occurs at the end of the header. The selected value and location is an arbitrary decision. All that is required is that the software and systems which need to make use of the indicator are programmed to know where to look and what to look for. For example, a hexadecimal value can be chosen so that a specific character or group of characters is spelled out when the hexadecimal value is converted to a known coding scheme such as ASCII or EBCDIC.

In the example of FIG. 4, the surrogate document image indicator is located in the last position of the header, position 65,432 (hexadecimal FF98). Thus, using the notation of the TIFF specification version 6.0, the indicator can be described as:

Tag=65432(FF98.H)
Type=LONG
Value=49857(C2C1.H)

The present invention has been described in terms of specific, example embodiments. FIG. 1, for example, provides only one of many possible system and network architectures that can be used to implement an example embodiment of the invention. However, one of ordinary skill in the computing, networking, and financial arts will quickly recognize that the invention can find use in other environments. Varied means of computer hardware and software can be used to establish the necessary data structures and carry out the various sub-processes and elements of the invention. The following claims are in no way intended to limit the scope of the invention to the specific embodiments described.

What is claimed is:

1. A method of processing an image of a document, the method comprising:
   using at least one computer to perform the following:
      receiving a captured image of the document from among a plurality of images of documents;
      performing a quality inspection of the captured image to determine if the captured image possesses acceptable image quality;

storing the captured image without a surrogate document image indicator in response to the captured image being determined to possess acceptable image quality;

retrieving a surrogate document image and replacing the captured image with the surrogate document image when the captured image does not possess acceptable image quality, wherein the surrogate document image includes the surrogate document image indicator comprising computer-readable indicia of surrogate status; and storing the surrogate document image among the plurality of images of documents.

2. The method of claim 1 further comprising:

retrieving at least some of the plurality of images of documents;

examining the at least some of the plurality of images of documents to detect the presence of the surrogate document image indicator; and including the surrogate document image in an exception list based on the presence of the surrogate document image indicator.

3. The method of claim 1 wherein the surrogate document image is a tagged image file format (TIFF) image and wherein the surrogate document image indicator is included in a header of the TIFF image.

4. The method of claim 2 wherein the surrogate document image is a tagged image file format (TIFF) image and wherein the surrogate document image indicator is included in a header of the TIFF image.

5. The method of claim 3 wherein the storing of the surrogate document image further comprises storing the surrogate document image in a check image management system.

6. The method of claim 4 wherein:

the storing of the surrogate document image further comprises storing the surrogate document image in a check image management system; and the retrieving of the at least some of the plurality of images comprises retrieving the at least some of the plurality of images from the check image management system.

7. A computer program product comprising a non-transitory computer-readable storage medium including instructions for performing the method of claim 1.

8. A computer program product comprising a non-transitory computer-readable storage medium including instructions for performing the method of claim 2.

9. A computer program product comprising a non-transitory computer-readable storage medium including instructions for performing the method of claim 3.

10. A computer program product comprising a non-transitory computer-readable storage medium including instructions for performing the method of claim 4.

11. Apparatus for processing an image of a document, the apparatus comprising:

means for receiving a captured image of the document from among a plurality of images of documents;

means for performing a quality inspection of the captured image to determine if the captured image possesses acceptable image quality;

means for storing the captured image without a surrogate document image indicator in response to the captured image being determined to possess acceptable image quality;

means for retrieving a surrogate document image and replacing the captured image with the surrogate document image when the captured image does not possess acceptable image quality, wherein the surrogate document image includes the surrogate document image indicator comprising computer-readable indicia of surrogate status; and means for storing the surrogate document image among the plurality of images of documents.

12. The apparatus of claim 11 further comprising:

means for retrieving at least some of the plurality of images of documents;

means for examining the at least some of the plurality of images of documents to detect a presence of the surrogate document image indicator; and means for including the surrogate document image in an exception list based on the presence of the surrogate document image indicator.

13. The apparatus of claim 11 wherein the means for storing the surrogate document image comprises a check image management system.

14. The apparatus of claim 12 wherein the means for storing the surrogate document image and the means for retrieving the at least some of the plurality of images comprise a check image system.

15. A system comprising:

connectivity to receive scanned images including a captured image;

a computer to:

perform a quality inspection of the captured image to determine if the captured image possesses acceptable image quality;

replace the captured image with a surrogate document image when a captured image does not possess acceptable image quality, wherein the surrogate document image includes a surrogate document image indicator comprising computer-readable indicia of surrogate status; and store the captured image without the surrogate document image indicator in response to the captured image being determined to possess acceptable image quality;

and a storage medium connected to the computing platform to store at least some of the scanned images and the surrogate document image.

16. The system of claim 15 further comprising a check image management system.

17. The system of claim 16 wherein the surrogate document image is a tagged image file format (TIFF) image and wherein the surrogate document image indicator is included in a header of the TIFF image.

18. The system of claim 15 wherein the surrogate document image is a tagged image file format (TIFF) image and wherein the surrogate document image indicator is included in a header of the TIFF image.

* * * * *